United States Patent
Ito et al.

(10) Patent No.: US 9,878,707 B2
(45) Date of Patent: Jan. 30, 2018

(54) HYBRID VEHICLE CONTROL DEVICE

(71) Applicant: Nissan Motor Co., Ltd., Yokohama-shi, Kanagawa (JP)

(72) Inventors: Ryosuke Ito, Kanagawa (JP); Takao Ando, Kanagawa (JP); Hiroki Iwasa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 68 days.

(21) Appl. No.: 14/917,121

(22) PCT Filed: Oct. 8, 2013

(86) PCT No.: PCT/JP2013/077320
§ 371 (c)(1),
(2) Date: Mar. 7, 2016

(87) PCT Pub. No.: WO2015/052769
PCT Pub. Date: Apr. 16, 2015

(65) Prior Publication Data
US 2016/0214601 A1    Jul. 28, 2016

(51) Int. Cl.
*B60W 20/40* (2016.01)
*B60W 10/02* (2006.01)
(Continued)

(52) U.S. Cl.
CPC .............. *B60W 20/40* (2013.01); *B60K 6/48* (2013.01); *B60W 10/02* (2013.01); *B60W 10/06* (2013.01);
(Continued)

(58) Field of Classification Search
CPC ....... B60W 20/40; B60W 10/02; B60W 10/06
(Continued)

(56) References Cited

U.S. PATENT DOCUMENTS

| | | | |
|---|---|---|---|
| 9,315,189 B2* | 4/2016 | Mould | |
| 2008/0228363 A1* | 9/2008 | Kouno | B60K 6/48 701/54 |
| 2013/0138309 A1* | 5/2013 | Kabe | F16H 61/66 701/58 |
| 2014/0129067 A1* | 5/2014 | Furukawa | B60K 6/442 701/22 |

(Continued)

FOREIGN PATENT DOCUMENTS

| | | |
|---|---|---|
| CN | 101077709 A | 11/2007 |
| CN | 103133681 A | 6/2013 |

(Continued)

*Primary Examiner* — Yazan Soofi
(74) *Attorney, Agent, or Firm* — Global IP Counselors, LLP

(57) ABSTRACT

A hybrid vehicle control device is provided for controlling a drive system. The hybrid vehicle control device is programmed to perform an engine start control using a motor/generator as an engine start motor when an engine start request is present.

The hybrid vehicle control device includes a second clutch control section and an engine start control section. The second clutch control section completely disengages the second clutch. The engine start control section engages or slip engages of the first clutch, and performs engine start control resulting from performing an engine cranking operation, injecting air and fuel and igniting same. The hybrid vehicle control module disengages the first clutch and engages the second clutch during coasting/regenerating driving with the motor/generator while traveling in an electric vehicle mode when the engine start request is due to a driver input for an increase in a required driving force.

14 Claims, 5 Drawing Sheets

(51) Int. Cl.
  *B60W 10/06* (2006.01)
  *B60W 10/08* (2006.01)
  *B60K 6/48* (2007.10)
  *B60W 30/18* (2012.01)

(52) U.S. Cl.
  CPC ...... *B60W 10/08* (2013.01); *B60W 30/18072* (2013.01); *B60W 2710/021* (2013.01); *B60W 2710/0616* (2013.01); *B60W 2710/081* (2013.01); *Y02T 10/6221* (2013.01); *Y10S 903/93* (2013.01)

(58) Field of Classification Search
  USPC .......................................................... 701/22
  See application file for complete search history.

(56) References Cited

U.S. PATENT DOCUMENTS

2014/0303822 A1\* 10/2014 Kawamura ............... B60K 6/48
                                                      701/22
2016/0046282 A1\* 2/2016 Yamazaki ............. B60W 20/40
                                                      477/5
2016/0221576 A1\* 8/2016 Wang .................... B60W 30/14
2016/0221580 A1\* 8/2016 Yamanaka ............ B60W 10/02

FOREIGN PATENT DOCUMENTS

| CN | 103213500 A   | 7/2013 |
|----|---------------|--------|
| JP | 2000-125405 A | 4/2000 |
| JP | 2008-55993 A  | 3/2008 |
| JP | 2008-105494 A | 5/2008 |
| JP | 2010-167961 A | 8/2010 |

\* cited by examiner

HYBRID VEHICLE CONTROL DEVICE

CROSS-REFERENCE TO RELATED APPLICATIONS

This application is a U.S. National stage application of International Application No. PCT/JP2013/077320, filed Oct. 8, 2013.

BACKGROUND

Field of the Invention

The present invention relates to a hybrid vehicle control device that carries out an engine start by a motor/generator in a hybrid vehicle that comprises an engine and a motor/generator.

Background Information

Conventionally, a hybrid vehicle control device is known in which, when the excess motor torque is insufficient in relation to the engine start torque while traveling in an electric vehicle traveling mode, the motor rotational speed is reduced by changing the transmission ratio of the transmission to the high side in order to eliminate torque shortage (for example, refer to Japanese Laid Open Patent Application No. 2008-105494).

SUMMARY

During a coasting/regenerating driving by a motor/generator, shock that is generated in the vehicle is easily felt; when an engine start is carried out at this time, it is conceivable that discomfort will be imparted to the driver due to the engine start shock. However, in a conventional hybrid vehicle control device, the engine is started by reducing the motor rotational speed by changing the transmission ratio of the transmission to the high side, suppressing the engine start shock is difficult. In addition, since the transmission ratio is changed to the high side, there is also the problem that causing the driver to feel the initial information acceleration is difficult, with respect to an increase in the required driving force that appears with accelerator depression.

In view of the problem described above, an object of the present invention is to provide a hybrid vehicle control device that can cause the sensation of an initial information acceleration with respect to an increase in the required driving force, while suppressing engine start shock during engine start during coasting/regenerating driving.

In order to achieve the object described above, the hybrid vehicle control device of the present invention comprises, in the drive system, an engine, a motor/generator, a first clutch interposed between the engine and the motor/generator, and a second clutch interposed between the motor/generator and a drive wheel; and an engine start control means that carries out engine start using the motor/generator as an engine start motor, when an engine start request based on an increase in the required driving force is generated during coasting/regenerating driving by the motor/generator in an electric vehicle mode in which traveling is carried out with the first clutch disengaged and the second clutch engaged. The engine start control means comprises a second clutch control section and an engine start control section. The second clutch control section completely disengages the second clutch. The engine start control section causes the first clutch to engage or to slip engage, and carries out an engine start control by carrying out an engine cranking operation, as well as injection and ignition of air and fuel.

Therefore, in the hybrid vehicle control device of the present invention, by completely disengaging the second clutch with the second clutch control section at the time of an engine start request, torque fluctuation that accompanies engine start is prevented from being transmitted to the driving wheels, and engine start shock can be suppressed. In addition, by disengaging the second clutch, the regenerative torque, coast deceleration equivalent to the engine brake will be released. Accordingly, it is possible to cause the sensation of the initial information acceleration with respect to an increase in the required driving force.

BRIEF DESCRIPTION OF THE DRAWINGS

Referring now to the attached drawings which form a part of this original disclosure.

DETAILED DESCRIPTION OF THE EMBODIMENTS

Figure 1:
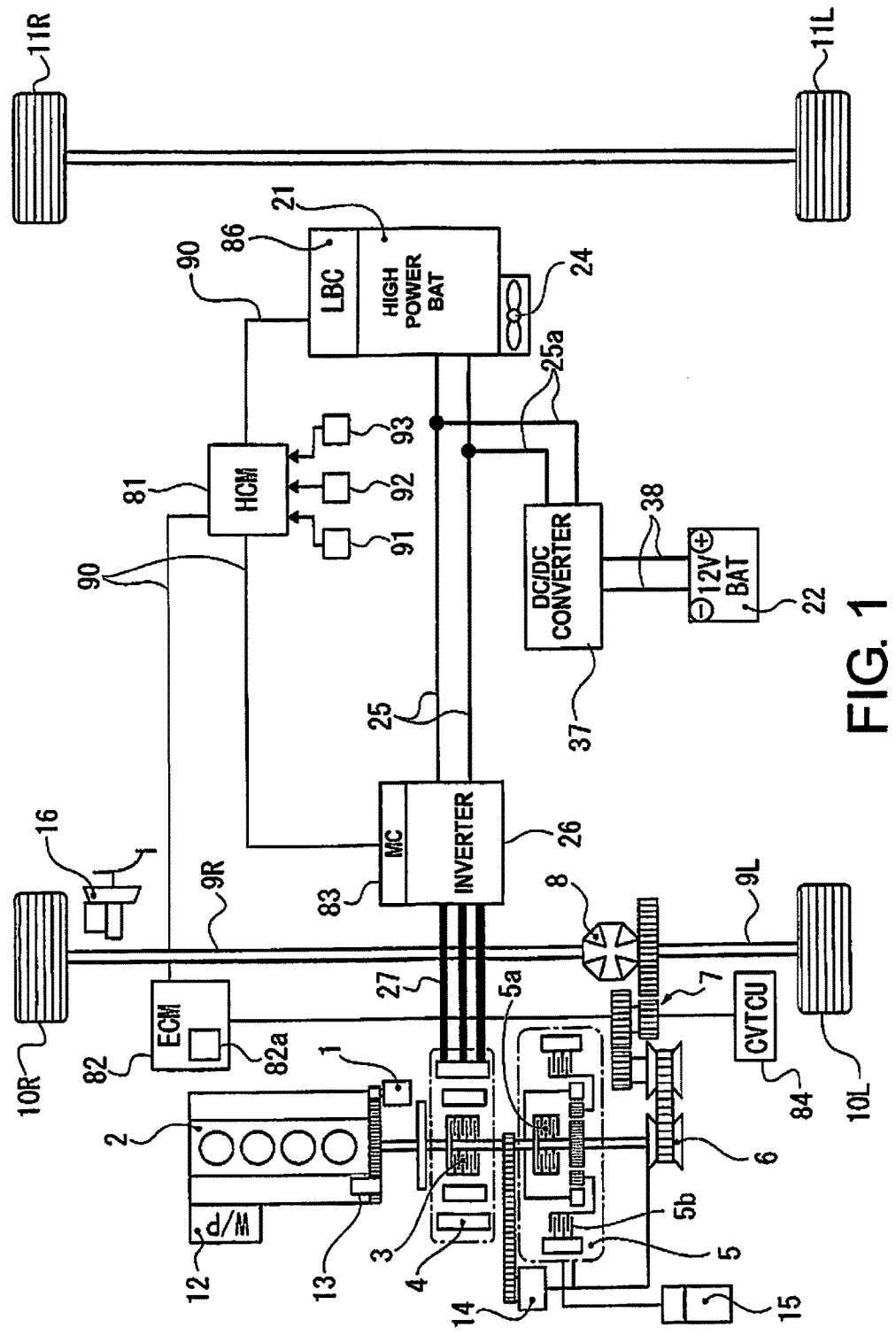
FIG. 1 is an overall system view illustrating an FF hybrid vehicle to which is applied the control device of the first embodiment.

A preferred embodiment for realizing the hybrid vehicle control device of the present invention is described below based on the first embodiment illustrated in the drawings.

First Embodiment

First, the "overall system configuration of an FF hybrid vehicle," and the "detailed configuration of the engine start control steps" will be separately described regarding the configuration of the hybrid vehicle control device of the first embodiment.

Overall System Configuration of an FF Hybrid Vehicle

FIG. 1 is an overall system view illustrating an FF hybrid vehicle to which is applied the control device of the first embodiment. The overall system configuration of an FF hybrid vehicle to which is applied the hybrid vehicle control device of the first embodiment will be described below, based on FIG. 1.

A drive system of an FF hybrid vehicle (one example of a hybrid vehicle) is provided with a starter motor 1, a transverse engine 2 (abbreviated "ENG"), a first clutch 3 (abbreviated "CL1"), a motor/generator 4 (abbreviated "MG"), a second clutch 5 (abbreviated "CL2"), and a belt type continuously variable transmission 6 (abbreviated "CVT"), as illustrated in FIG. 1. An output shaft of the belt type continuously variable transmission 6 is drivingly coupled to the left and right front wheels 10L, 10R, which are drive wheels, via a final reduction gear train 7, a differential gear 8, and left and right drive shafts 9L, 9R. The left and right rear wheels 11L, 11R are configured as driven wheels.

The starter motor 1 is a cranking motor having a gear that meshes with an engine starting gear provided to a crankshaft of the transverse engine 2, and which rotationally drives the crankshaft at the time of engine start.

The transverse engine 2 is an engine disposed in a front room with the crankshaft direction as the vehicle width direction, which becomes a drive source of the FF hybrid vehicle. The transverse engine 2 comprises an electric water pump 12 and a crankshaft rotation sensor 13 that detects a reverse rotation of the transverse engine 2. In addition, a compressor (not shown) for an interior air conditioner is driven by this transverse engine 2. Additionally, the intake negative pressure of the transverse engine 2 is introduced into an unillustrated negative pressure booster.

The first clutch 3 is a hydraulically actuated, normally open dry, multi-plate friction clutch which is interposed between the transverse engine 2 and the motor/generator 4, in which complete engagement/slip engagement/disengagement are controlled by a first clutch hydraulic pressure.

The motor/generator 4 is a three-phase alternating current permanent magnet type synchronous motor which is coupled to the transverse engine 2 via the first clutch 3, and becomes a drive source of the FF hybrid vehicle. When a positive torque (drive torque) command is being outputted from the motor controller 83 to the inverter 26, this motor/generator 4 performs a driving operation which generates drive torque using discharge power from a high power battery 21, to drive (powering) the left and right front wheels 10L, 10R. On the other hand, when a negative torque (generation torque) command is outputted from the motor controller 83 to the inverter 26, a generation operation is performed in which rotational energy from the left and right front wheels 10L, 10R is converted to electric energy, and the generated power will be the charging power of the high power battery 21 (regeneration). The motor/generator 4 and the inverter 26 are connected via an AC harness 27.

The second clutch 5 is a hydraulically actuated, normally open dry, multi-plate friction clutch which is interposed between the motor/generator 4 and the left and right front wheels 10L, 10R, which are drive wheels, in which complete engagement/slip engagement/disengagement are controlled by a second clutch hydraulic pressure. The second clutch 5 of the first embodiment is configured by diverting a forward clutch 5a and a reverse brake 5b provided to a forward/reverse switching mechanism of the belt type continuously variable transmission 6 configured by a planetary gear. That is, the forward clutch 5a is used as the second clutch 5 during forward traveling, and the reverse brake 5b is used as the second clutch 5 during reverse traveling.

The belt type continuously variable transmission 6 is a transmission that achieves a stepless transmission ratio by changing the winding diameter of the belt by applying shifting hydraulic pressure to a primary oil chamber and a secondary oil chamber. This belt type continuously variable transmission 6 comprises a main oil pump 14 (mechanical drive), a sub oil pump 15 (motor drive), and an unillustrated control valve unit that produces the first and second clutch hydraulic pressure and the shifting hydraulic pressure, using the line pressure PL generated by adjusting the pump discharge pressure from the main oil pump 14 as the source pressure. The main oil pump 14 is rotationally driven by a motor shaft of the motor/generator 4 (transmission input shaft). The sub oil pump 15 is mainly used as an auxiliary pump for producing lubrication and cooling oil.

In the FF hybrid vehicle, a one-motor-two-clutch drive system is configured by the first clutch 3, the motor/generator 4, and the second clutch 5, and this drive system comprises an "EV mode," an "HEV mode," and a "WSC mode" as the main traveling modes (drive modes) thereof. The "EV mode" is an electric vehicle mode in which the first clutch 3 is released and the second clutch 5 is engaged, and in which the motor/generator 4 is the only drive source; traveling by this "EV mode" is referred to as "EV traveling". A traveling mode in which coasting deceleration is carried out with the accelerator OFF (state in which the foot is away from the accelerator) while carrying out regeneration with the motor/generator 4 during this "EV mode" is called "coasting/regenerating driving" or "sailing mode traveling." The presence/absence of a brake operation shall not be questioned at this time. The "HEY" mode is a hybrid vehicle mode in which the first and second clutches 3, 5 are engaged, and in which the transverse engine 2 and the motor/generator 4 are the drive sources; traveling by this "HEV mode" is referred to as "HEV traveling." Depending on the use of the motor/generator 4, this "HEV mode" is subdivided into: an engine vehicle mode (zero torque command to the motor/generator 4)/a motor assist mode (positive torque command to the motor/generator 4)/an engine generation mode (negative torque command to the motor/generator 4). The "WSC mode" is an engine-use slip mode, in which the first clutch 3 is engaged while the second clutch 5 is slip engaged with a transmission torque capacity corresponding to the required driving force in a state in which the transverse engine 2 is operated, and traveling is carried out while including the transverse engine 2 as a power source.

The regenerative cooperation brake unit 16 in FIG. 1 is a device that controls the total braking torque, accompanying the fact that regenerative operation is carried out in principle during brake operation. This regenerative cooperation brake unit 16 comprises a brake pedal, a negative pressure booster that uses the intake negative pressure of the transverse engine 2, and a master cylinder. Then, at the time of a brake operation, the unit carries out a cooperative control of the regeneration amount/fluid pressure amount, so that the amount obtained by subtracting the regenerative braking force from the requested braking force based on the pedal operation amount is allotted to the hydraulic braking force.

The power supply system of the FF hybrid vehicle is provided with a high power battery 21 as the motor/generator power source, and a 12V battery 22 as a 12V system load power source, as illustrated in FIG. 1.

The high power battery 21 is a secondary battery mounted as the power source of the motor/generator 4, and, for example, a lithium ion battery is used therefor, in which a cell module configured from a number of cells is set inside a battery pack case. A junction box which aggregates a relay circuit for carrying out supply/cutoff/distribution of heavy current is built in to this high power battery 21, and further attached thereto are a cooling fan unit 24 having a battery cooling function, and a lithium battery controller 86 which monitors the battery charge capacity (battery SOC) and the battery temperature.

The high power battery 21 and the motor/generator 4 are connected via a DC harness 25 and an AC harness 27. A motor controller 83 for performing powering/regeneration control is attached to the inverter 26. That is, the inverter 26 converts the direct current from the DC harness 25 to a three-phase alternating current to the AC harness 27 during powering, when the motor/generator 4 is driven by the discharge of the high power battery 21. In addition, the inverter converts the three-phase alternating current from the AC harness 27 to a direct current to the DC harness 25, during regeneration for charging the high power battery 21 with the power generation by the motor/generator 4.

The 12V battery 22 is a secondary battery mounted as a power source of a 12V system load, which is an auxiliary machine; for example, a lead battery mounted on an engine vehicle or the like is used. The high power battery 21 and the 12V battery 22 are connected via a DC branch harness 25a, a DC/DC converter 37, and a battery harness 38. The DC/DC converter 37 is for converting several hundred volts from the high power battery 21 to 12V, which is configured to manage the charging amount of the 12V battery 22 by controlling this DC/DC converter 37 with a hybrid control module 81.

The control system of an FF hybrid vehicle comprises the hybrid control module 81 (abbreviated: "HCM") as an integrated control means having a function to appropriately manage the energy consumption of the entire vehicle, as illustrated in FIG. 1. An engine control module 82 (abbreviated: "ECM"), a motor controller 83 (abbreviated: "MC"), a CVT control unit 84 (abbreviated "CVTCU"), and a lithium battery controller 86 (abbreviated: "LBC") are provided as control means that are connected to this hybrid control module 81. These control means including the hybrid control module 81 are connected so as to be capable of exchanging bidirectional information by a CAN communication line 90 (CAN is an abbreviation for "Controller Area Network").

The hybrid control module 81 carries out various controls, based on input information from each of the control means, an ignition switch 91, an accelerator position opening amount sensor 92, a vehicle speed sensor 93, and the like. The engine control module 82 carries out fuel injection control, ignition control, fuel cut control, and the like of the transverse engine 2. The motor controller 83 carries out powering control, regenerative control, and the like of the motor/generator 4 by the inverter 26. Output rotational speed information of the motor/generator 4 from an MG rotational speed sensor 94 is inputted to this motor controller 83. The CVT control unit 84 carries out the engagement hydraulic pressure control of the first clutch 3, the engagement hydraulic pressure control of the second clutch 5, the shifting hydraulic pressure control of the belt type continuously variable transmission 6, and the like. Transmission input rotational speed information (second clutch output rotational speed information) from a transmission input rotational speed sensor 95 is inputted to this CVT control unit 84. The lithium battery controller 86 manages the battery SOC, the battery temperature, and the like of the high power battery 21.

Detailed Configuration of the Engine Start Control Steps

Figure 2:
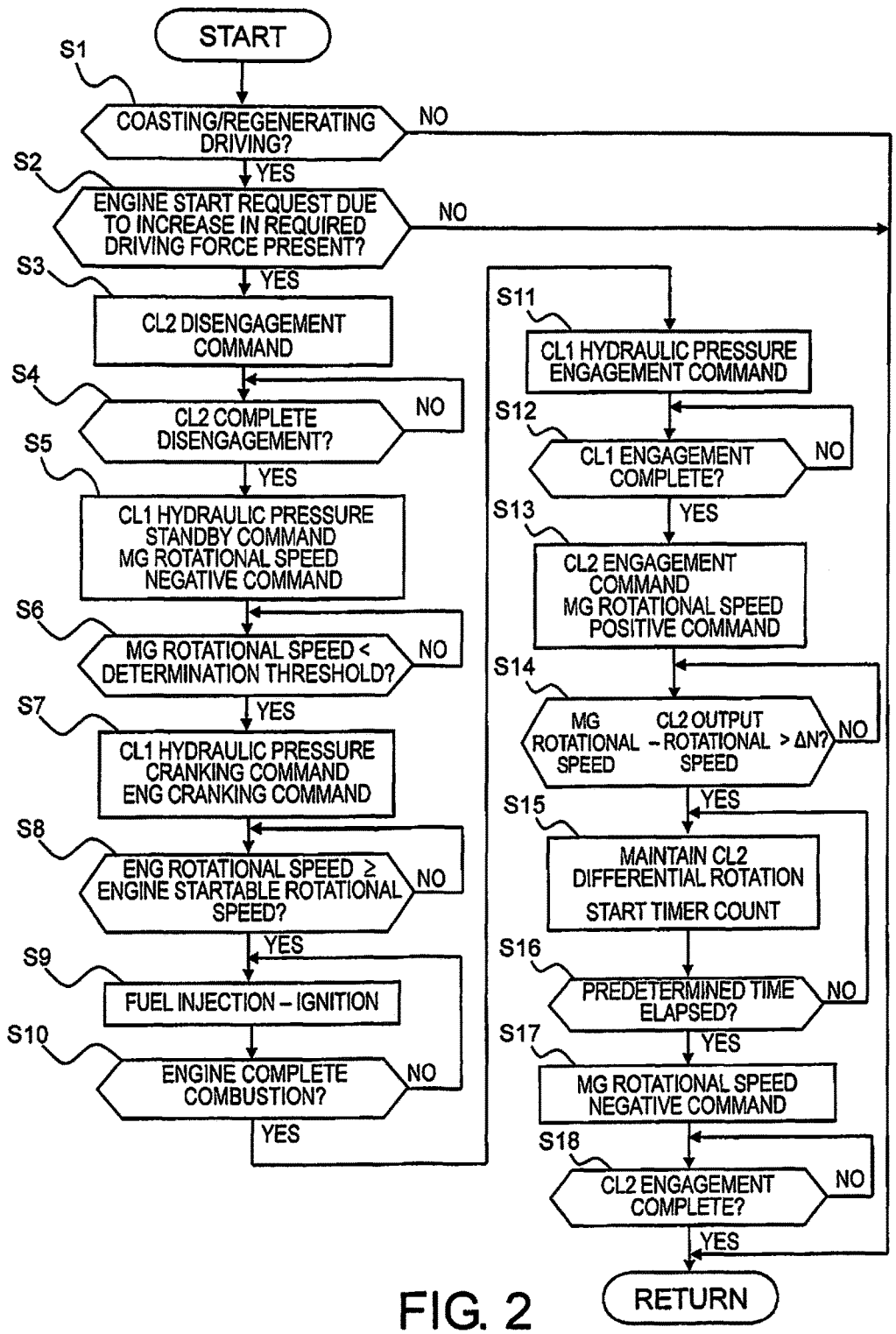
FIG. 2 is a flowchart illustrating the flow of the engine start control steps (engine start control means) that are executed by a hybrid control module.

FIG. 2 is a Flowchart illustrating the flow of an engine start control steps (engine start control means) that are executed by a hybrid control module. Each step in FIG. 2 showing the detailed configuration of the engine start control steps will be described below. This engine start control steps are repeatedly executed during the "EV mode."

In Step S1, it is determined whether or not the current traveling mode (drive mode) is "coasting/regenerating driving." If YES (coasting/regenerating driving), the steps proceed to Step S2. If NO (other than coasting/regenerating driving), the steps proceed to RETURN. Here, the determination of coasting/regenerating driving is carried out when the accelerator is OFF while carrying out regeneration with the motor/generator 4 during the "EV mode."

In Step S2, following the determination of "coasting/regenerating driving" in Step S1, it is determined whether or not an engine start request has been generated due to an increase in the required driving force from the driver. If YES (engine start request due to increased required driving force present), the steps proceed to Step S3. If NO (engine start request due to increased required driving force absent), the steps proceed to RETURN. Here, an "engine start request due to increased required driving force" means that the accelerator position opening amount has exceeded a threshold value set in advance and that a mode change command which changes the traveling mode from the "EV mode" to the "HEV mode" has been outputted therewith.

In Step S3, following the determination that an engine start request due to increased required driving force is present in Step S2, a CL2 disengagement command for disengaging the second clutch 5 is outputted, and the steps proceed to Step S4. This CL2 disengagement command is outputted to the CVT control unit 84.

In Step S4, following an output of a CL2 disengagement command in Step S3, it is determined whether or not the second clutch 5 has been completely disengaged. If YES (CL2 completely disengaged), the steps proceed to Step S5. If NO (CL2 not completely disengaged), the steps repeat Step S4. Here, the complete disengagement of the second clutch 5 is determined by the clutch engagement capacity (second clutch torque) of the second clutch 5 reaching below a predetermined value that can be determined to be zero. The second clutch torque is detected by an unillustrated second clutch torque sensor.

In Step S5, following a determination that CL2 is completely disengaged in Step S4, a CL1 hydraulic pressure command which sets the hydraulic pressure of the first clutch 3 to a standby hydraulic pressure, and an MG rotational speed command which reduces the output rotational speed of the motor/generator 4 to be smaller than the second clutch output rotational speed are outputted, and the steps proceed to Step S6. Accordingly, the rotational speed of the motor/generator 4 starts to be reduced; at this time, the motor rotational speed is gradually reduced over time. The "second clutch output rotational speed" is the input rotational speed (PRI rotational speed) to the belt type continuously variable transmission 6, which is detected by the transmission input rotational speed sensor 95. The "standby hydraulic pressure" is a hydraulic pressure that eliminates play in the hydraulic pressure of the first clutch 3, to put the first clutch 3 in a state immediately before the engagement operation is started.

In Step S6, following an output of a CL1 hydraulic pressure command and an MG rotational speed command in Step S5, it is determined whether or not the rotational speed of the motor/generator 4 which is made smaller than the second clutch output rotational speed, has fallen below a predetermined determination threshold. If YES (MG rotational speed<determination threshold), the steps proceed to Step S7. If NO (MG rotational speed≥determination threshold), the steps repeat Step S6. Here, the "determination threshold" is set to a rotational speed at which the output torque from the motor/generator 4 reaches a torque necessary for engine cranking.

In Step S7, following the determination that MG rotational speed<determination threshold in Step S6, a CL1 hydraulic pressure command which sets the hydraulic pressure of the first clutch 3 to a cranking hydraulic pressure, and a cranking command of the transverse engine 2 are outputted, and the steps proceed to Step S8. Accordingly, the rotation of the motor/generator 4 is transmitted to the transverse engine 2, and the engine rotational speed starts to increase. Here, "cranking hydraulic pressure" is a clutch engagement hydraulic pressure that is capable of transmitting the torque necessary for engine cranking.

In Step S8, following the output of the CL1 hydraulic pressure command and the cranking command in Step S7, it is determined whether or not the rotational speed of the transverse engine 2 has become equal to or greater than an engine startable rotational speed which is set in advance. If YES (ENG rotational speed≥engine startable rotational speed), the steps proceed to Step S9. If NO (ENG rotational speed<engine startable rotational speed), the steps repeat Step S8. Here, the "engine startable rotational speed" is a rotational speed at which the transverse engine 2 becomes capable of autonomous operation, by injecting a set amount of air and fuel and igniting the same. Here, the engine startable rotational speed is set to a rotational speed that is lower than the determination threshold set in Step S6.

In Step S9, following the determination that ENG rotational speed≥engine startable rotational speed in Step S8, a set amount of air and fuel is injected and ignited to start the engine, and the steps proceed to Step S10.

In Step S10, following the injection→ignition of air/fuel in Step S9, it is determined whether or not the transverse engine 2 has become a complete combustion state. If YES (engine complete combustion), the steps proceed to Step S11. If NO (engine incomplete combustion), the steps return to Step S9.

In Step S11, following an engine complete combustion determination in Step S10, a CL1 hydraulic pressure command which sets the hydraulic pressure of the first clutch 3 to an engagement hydraulic pressure is outputted, and the steps proceed to Step S12.

In Step S12, following an output of the CL1 hydraulic pressure command in Step S11, it is determined whether or not the first clutch 3 has been completely engaged. If YES (CL1 engagement completed), the steps proceed to Step S13. If NO (CL1 not engaged), the steps return to Step S12. Here, the engagement determination of the first clutch 3 is carried out based on the clutch stroke of the first clutch.

In Step S13, following a determination that CL1 engagement is completed in Step S12, a CL2 engagement command for engaging the second clutch 5, and an MG rotational speed command which increases the output rotational speed of the motor/generator 4 to be higher than the second clutch output rotational speed are outputted, and the steps proceed to Step S14. Accordingly, the second clutch engagement capacity starts to increase; at this time, the increase is made to be a gradual increase over time, at a change rate in accordance with the vehicle speed or the required driving force which is presented in the accelerator position opening amount. Additionally, the rotational speed of the motor/generator 4 also starts to increase; at this time, the motor rotational speed is gradually increased over time.

In Step S14, following an output of a CL2 engagement command and an MG rotational speed command in Step S13, it is determined whether or not a value obtained by subtracting the second clutch output rotational speed (transmission input rotational speed) from the rotational speed of the motor/generator 4, that is, the second clutch differential rotation, as exceeded a predetermined differential rotation ($\Delta N$) which is set in advance. If YES (MG rotational speed−CL2 output rotational speed>$\Delta N$), the steps proceed to Step S15. If NO (MG rotational speed−CL2 output rotational speed≤$\Delta N$), the steps repeat Step S14.

In Step S15, following the determination that MG rotational speed−CL2 output rotational speed>$\Delta N$ in Step S14, the second clutch 5 is assumed to have been slip engaged in a state in which the rotational speed on the clutch input side is high, and the differential rotation in this second clutch 5 is maintained while counting of the time that the differential rotation is maintained (timer count) is started, and the steps proceed to Step S16.

In Step S16, following the maintaining of the differential rotation and starting of the timer count in Step S15, it is determined whether or not the time that the differential rotation is maintained has elapsed a predetermined time. If YES (predetermined time elapsed), the steps proceed to Step S17. If NO (predetermined time not elapsed), the steps return to Step S15. Here, the "predetermined time" is the time from after the start of the transverse engine 2 until the engine output torque becomes stable.

In Step S17, following a determination that the predetermined time has elapsed in Step S16, an MG rotational speed command in which the output rotational speed of the motor/generator 4 is reduced in order to approximate the output rotational speed of the second clutch is outputted, and the steps proceed to Step S18.

In Step S18, following an output of the MG rotational speed command in Step S17, it is determined whether or not the second clutch 5 has been engaged. If YES (second clutch engaged), the steps proceed to RETURN. If NO (second clutch non-engaged), the steps return to Step S17. Here, the engagement of the second clutch 5 is determined by the differential rotation in the second clutch 5 becoming zero, while the clutch engagement capacity (second clutch torque) of the second clutch 5 reaches a predetermined value with which it can be determined that the torque has become an engagement torque.

Next, the actions are described. First, the "problem when starting the engine during coasting/regenerating driving" will be described, followed by a description of the engine start control action in the FF hybrid vehicle control device of the first embodiment.

Problem when Starting the Engine During Coasting/Regenerating Driving

Figure 3:
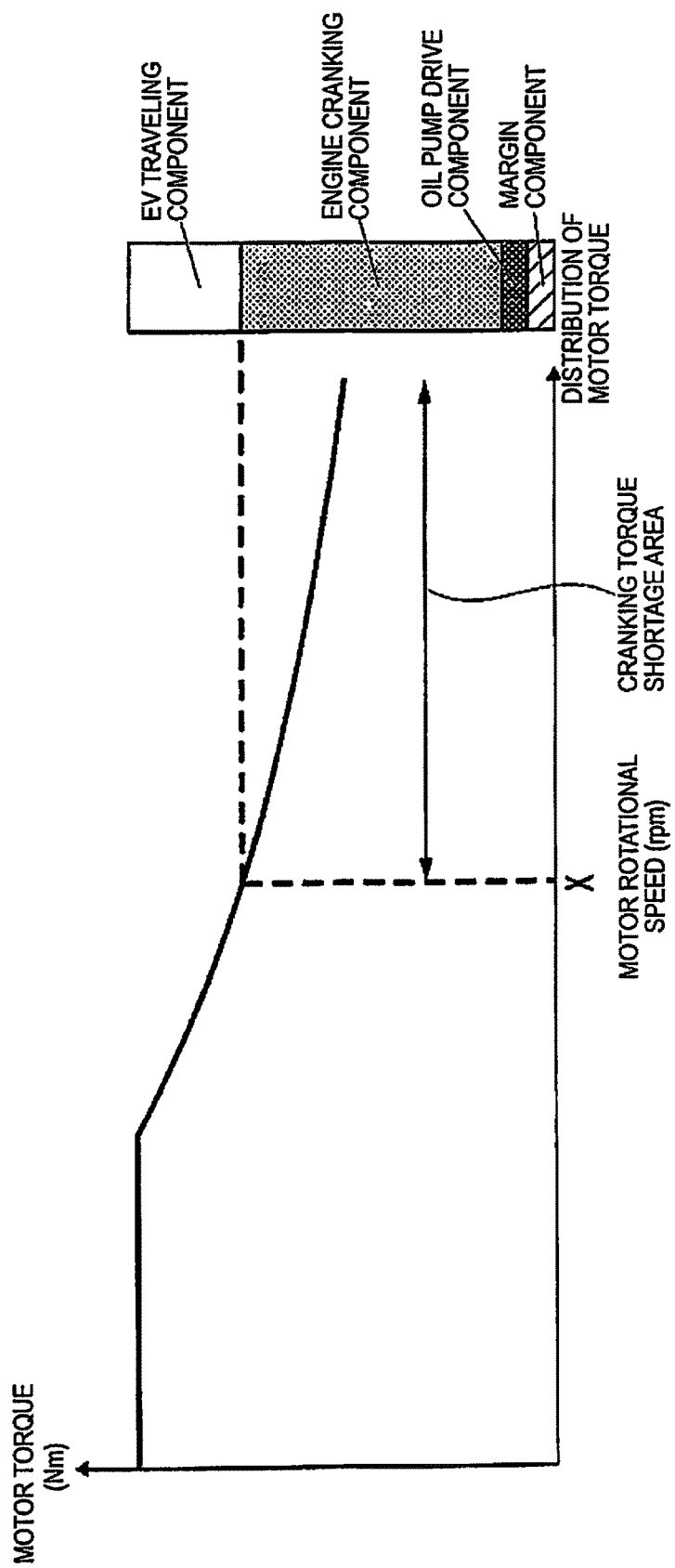
FIG. 3 is a map illustrating the relationship between the motor rotational speed and the motor torque in the motor/generator, and an explanatory view illustrating the distribution of the motor torque.
Figure 4:
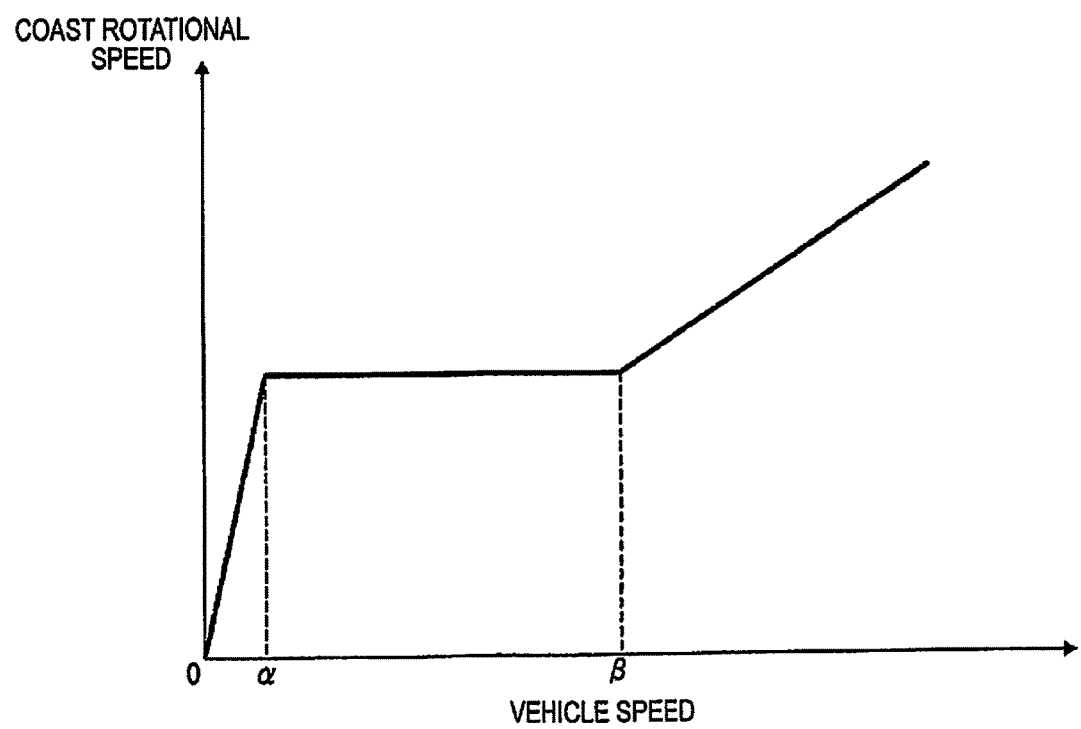
FIG. 4 is an explanatory view illustrating the relationship between the vehicle speed and the coasting rotational speed during coasting/regenerating driving.

FIG. 3 is a map illustrating the relationship between the motor rotational speed and the motor torque in the motor/generator, and an explanatory view illustrating the distribution of the motor torque. FIG. 4 is an explanatory view illustrating the relationship between the vehicle speed and the coasting rotational speed during coasting/regenerating driving. The problem when starting the engine during coasting/regenerating driving will be described below, based on FIG. 3 and FIG. 4.

In the FF hybrid vehicle of the first embodiment, it is necessary to carry out traveling and engine start by utilizing the output torque of the motor/generator 4. Accordingly, the torque that can be outputted in the motor/generator 4 is distributed to an EV traveling component (component required for regeneration), engine cranking component, oil pump drive component, and the margin for control variation component, as illustrated in FIG. 3.

Here, it is necessary to secure the motor torque of the engine cranking component during the "EV mode" in which the transverse engine 2 is stopped, so that engine start can be promptly carried out when an engine start request is generated due to an increase in the required driving force, etc., which is presented in the accelerator position opening amount.

However, if an engine cranking component is constantly secured in a low-rated motor, there will be hardly any motor torque of the EV traveling component (component required for regeneration). Consequently, in a low-rated motor, it is difficult to stop the transverse engine 2 and enter the "EV mode" and it is difficult to achieve an improvement in fuel efficiency. In addition, if a high-rated motor and a high voltage battery are used, the torque that can be outputted by the motor is increased, and the traveling component (component required for regeneration) torque is increased, even if the engine cranking component torque is secured. Accordingly, the "EV mode" can be maintained for a long period of time. However, there is the problem that cost and installation space of the motor and the like are increased.

Furthermore, the motor/generator 4 has a feature that the motor torque is decreased if the motor rotational speed is increased, as illustrated in FIG. 3. That is, regardless of the rating of the motor/generator, when greater than or equal to a predetermined motor rotational speed X, there would be insufficient cranking torque, and the "EV mode" could not be continued.

On the other hand, coasting/regenerating driving (sailing mode traveling) in which coast deceleration is carried out while carrying out regeneration with the motor/generator 4 during the "EV mode," is carried out when the accelerator is OFF, in other words, a state in which the foot is away from the accelerator. At this time, the coasting rotational speed (output rotational speed of the motor/generator 4) is increased proportionately with the increase in the vehicle speed until the vehicle speed reaches a first vehicle speed $\alpha$, as illustrated in FIG. 4. This coasting rotational speed is maintained at a constant value that is determined from the regenerative efficiency, the oil quantity balance in the belt type continuously variable transmission 6, and the like, regardless of the vehicle speed from the first vehicle speed $\alpha$ to a second vehicle speed $\beta$, and is increased proportionately with the increase in the vehicle speed again when the vehicle speed becomes higher than the second vehicle speed $\beta$.

That is, it is necessary to maintain the coasting rotational speed at a predetermined constant value in order to secure regenerative efficiency during coasting/regenerating driving. However, as described above, in the motor/generator 4, the motor torque is reduced if the motor rotational speed is high. Consequently, it was difficult to maintain the coasting/regenerating driving with a good regenerative efficiency, while ensuring the engine cranking component motor torque.

Moreover, when carrying out this coasting/regenerating driving, the state is a state in which the foot is away from the accelerator, shock that is generated in the vehicle is easily felt, and it is conceivable that engine start shock will be felt as a discomfort. In addition, when the accelerator is depressed and an engine start request is generated during coasting/regenerating driving, an increase in the required driving force is conceivable, which is presented in the accelerator depression operation; therefore, it is necessary to cause the driver to feel the initial information acceleration.

Effect of the Engine Start Control

Figure 5:
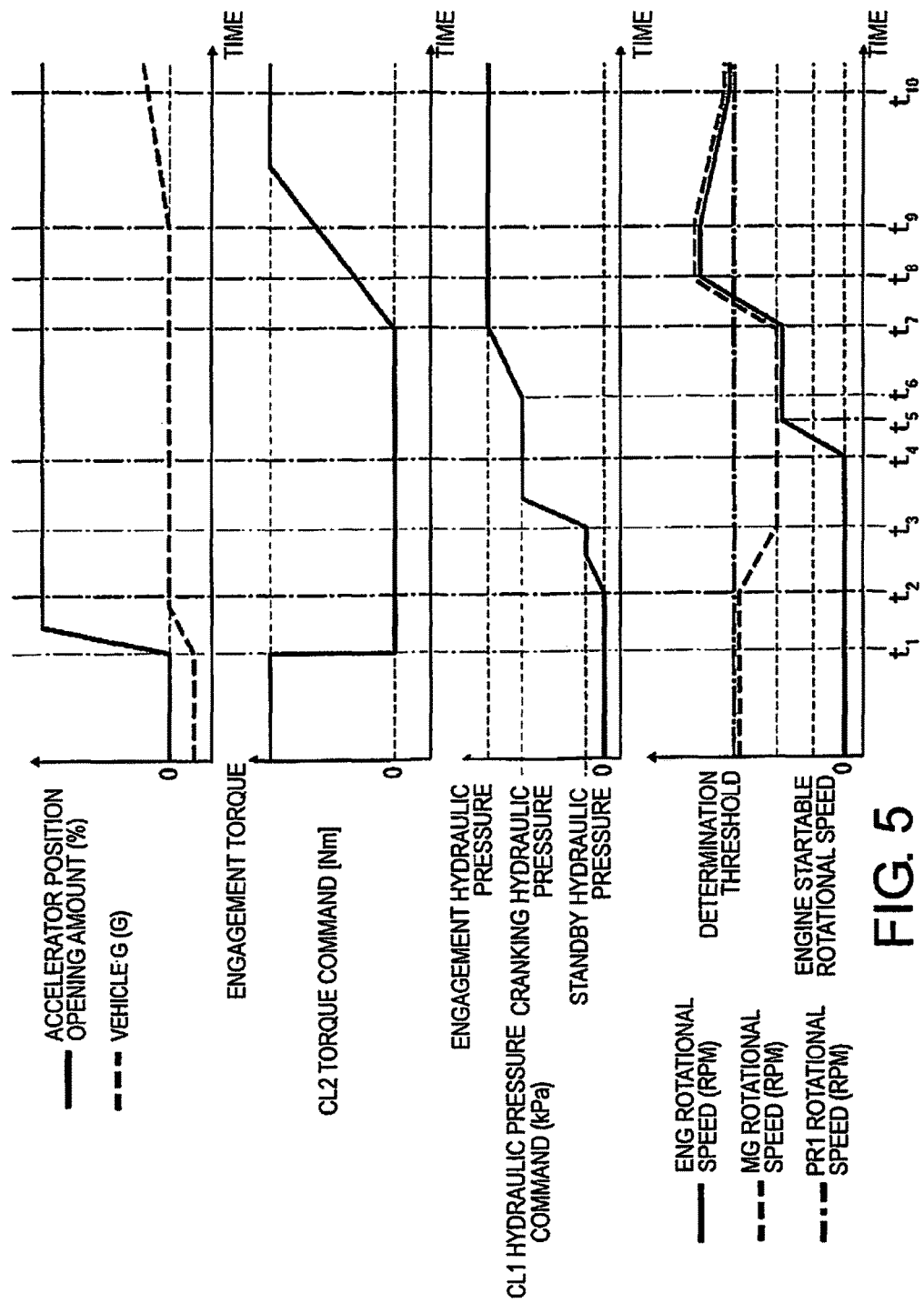
FIG. 5 is a time chart illustrating each feature of an accelerator position opening amount, vehicle acceleration, CL2 torque command, CL1 hydraulic pressure command, ENG rotational speed, MG rotational speed, and PRI rotational speed, when an accelerator depression engine start request has been generated during coasting/regenerating driving, in the control device of the first embodiment.

FIG. 5 is a time chart illustrating each feature of an accelerator position opening amount, vehicle acceleration, CL2 torque command, CL1 hydraulic pressure command, ENG rotational speed, MG rotational speed, and PRI rotational speed, when an accelerator depression engine start request has been generated during coasting/regenerating driving, in the control device of the first embodiment. The engine start control action of the first embodiment will be described below, based on FIG. 5.

In the FF hybrid vehicle of the first embodiment, if the accelerator is depressed at a point in time indicated in FIG. 5, during coasting/regenerating driving in which coast deceleration is carried out in a state in which the foot is away from the accelerator while carrying out regeneration by the motor/generator 4 during the "EV mode," the accelerator position opening amount is increased and an engine start request is generated. Accordingly, in the flowchart illustrated in FIG. 2, the steps proceed to Step S1→Step S2→Step S3, and a CL2 disengagement command for disengaging the second clutch 5 is outputted. That is, the second clutch torque command (command with respect to the clutch engagement capacity in the second clutch 5) becomes zero.

Then, by the second clutch 5 being disengaged, the torque transmission path between the motor/generator 4 and the left and right front wheels 10L, 10R which are drive wheels, is cut off, and the regenerative torque equivalent to the engine brake that was generated by the motor torque of the motor/generator 4 the coasting deceleration (acceleration in the decelerating direction) which was acting on the vehicle, is released. Accordingly, negative vehicle acceleration is changed to zero, but, at this time, the same phenomenon occurs as when vehicle acceleration is generated in the acceleration direction. As a result, it is possible to cause the driver to feel the initial information acceleration with respect to an increase in the required driving force.

At time $t_2$, the clutch engagement capacity (second clutch torque) in the second clutch 5 becomes zero, and the second clutch 5 is determined to be completely disengaged. Accordingly, the steps proceed to Step S4→Step S5, and a CL1 hydraulic pressure command which sets the hydraulic pressure of the first clutch 3 to a standby hydraulic pressure, and an MG rotational speed command which reduces the output rotational speed of the motor/generator 4 to be smaller than the second clutch output rotational speed are outputted. Accordingly, the engagement hydraulic pressure of the first clutch 3 is increased and becomes the standby hydraulic pressure. In addition, the rotational speed of the motor/generator 4 is gradually reduced over time. When reducing the motor rotational speed, the second clutch 5 is already disengaged and the load that acts on the motor/generator 4 has been reduced. Accordingly, reduction of the motor rotational speed can be carried out quickly. Additionally, by achieving a reduction in the motor rotational speed, increase in the motor torque can be achieved.

At time $t_3$, when the rotational speed of the motor/generator 4 reaches a determination threshold which is set in advance, the steps proceed to Step S6→Step S7, and a CL1 hydraulic pressure command which sets the engagement hydraulic pressure of the first clutch 3 to a cranking hydraulic pressure, and a cranking command of the transverse engine 2 are outputted. Accordingly, the hydraulic pressure of the first clutch 3 is increased and becomes the cranking hydraulic pressure. Since this cranking hydraulic pressure is lower than the engagement hydraulic pressure, the first clutch 3 enters a slip engagement state. In addition, at this time, the motor rotational speed has reached a determination threshold, which is rotational speed at which the output torque from the motor/generator 4 reaches a torque necessary for engine cranking. In other words, the motor/generator 4 is in a state that is capable of outputting a motor torque that is necessary for cranking. Accordingly, the transverse engine 2 can be cranked with the motor/generator 4.

Then, at time $t_4$, the rotational speed of the transverse engine 2 starts to increase, and at time $t_5$, the motor rotational speed and the engine rotational speed are matched. At this time, the motor rotational speed is maintained at the determination threshold, and this determination threshold is a higher rotational speed than the engine startable rotational speed. That is, at this time t5, the engine rotational speed has exceeded the engine startable rotational speed, the steps proceed to Step S8→Step S9, and a set amount of air and fuel is injected and an ignition operation is carried out, with respect to the transverse engine 2. At this time, since the second clutch 5 is completely disengaged, the torque variation accompanying an engine start can be prevented from being transmitted to the left and right front wheels 10L, 10R, which are drive wheels. Accordingly, even if the transverse engine 2 is completely combusted, transmission of engine start shock can be suppressed, and discomfort being imparted to the driver can be prevented.

When the transverse engine 2 is completely combusted at time $t_6$, the steps proceed to Step S10→Step S11, and a CL1 hydraulic pressure command which sets the hydraulic pressure of the first clutch 3 to the engagement hydraulic pressure is outputted. Then, the first clutch hydraulic pressure is increased, and the first fluid 3 is completely engaged at time $t_7$. Accordingly, the steps proceed to Step S13, and at time t7, a CL2 engagement command for engaging the second clutch 5, and an MG rotational speed command which increases the output rotational speed of the motor/generator 4 to be higher than the second clutch output rotational speed are outputted. The rotational speed of the motor/generator 4 is maintained at the determination threshold until this time $t_7$.

By a CL2 engagement command for engaging the second clutch 5 being outputted, the second clutch torque command starts to increase from time $t_7$. Here, this second clutch torque command is gradually increased over time at a change rate in accordance with the vehicle speed or the required driving force which is presented in the accelerator position opening amount. On the other hand, by an MG rotational speed command which increases the output rotational speed of the motor/generator 4 to be higher than the second clutch output rotational speed being outputted, the motor rotational speed starts to increase from time $t_7$. Here, since the first clutch 3 is engaged, the engine rotational speed increases in the same way as the motor rotational speed.

At time $t_8$, when a value obtained by subtracting the second clutch output rotational speed (transmission input rotational speed) from the rotational speed of the motor/generator 4, that is, the second clutch differential rotation, reaches a predetermined differential rotation ($\Delta N$) which is set in advance, the steps proceed to Step S14→Step S15, and the differential rotation in the second clutch 5 is maintained while the timer count is started. Then, when a predetermined time has elapsed at time t9, the steps proceed to Step S16→Step S17→Step S18, the rotational speeds of the motor/generator 4 and the transverse engine 2 start to decrease, the differential rotation in the second clutch becomes zero at time $t_{10}$ while the clutch engagement capacity (second clutch torque) in the second clutch 5 becomes the engagement torque, the engagement of the second clutch 5 is assumed as completed, and the engine start control is ended.

In this manner, in the hybrid vehicle control device of the first embodiment, if an engine start request which accompanies an accelerator depression is generated during coasting/regenerating driving, the second clutch 5 is completely disengaged while the rotational speed of the motor/generator 4 is reduced to less than the second clutch output rotational speed. Then, the first clutch 3 is slip engaged and an engine start control is carried out. Accordingly, the engine start shock that is generated at the time of engine start control can be suppressed, and discomfort being imparted to the driver can be prevented. In addition, when the second clutch 5 is disengaged, the regenerative torque=coast deceleration equivalent to the engine brake that was being generated by the motor/generator 4 is released, and it becomes possible to cause the sensation of an initial information acceleration with respect to an increase in the required driving force. Additionally, since the motor rotational speed is reduced, it is possible to achieve an increase in the motor torque, and the engine can be reliably started by securing the torque necessary for engine cranking. That is, torque that is necessary for engine start can be secured even when traveling at a high vehicle speed in a vehicle mounted with a low-rated motor.

Furthermore, by reducing the rotational speed of the motor/generator 4, a first clutch differential rotation at the time of engine start, that is, the difference between the engine rotational speed and the motor rotational speed can be reduced. Accordingly, the heating value of the first fluid 3 at the time of engine start can be reduced, and the durability of the first clutch 3 can be improved.

In this first embodiment, upon reducing the rotational speed of the motor/generator 4, the rotational speed is gradually decreased over time. That is, the motor rotational speed is prevented from being abruptly changed. Accordingly, even if the rotational speed of the motor/generator 4 is reduced before the second clutch 5 is completely disengaged, shock accompanying fluctuation in the motor rotational speed or fluctuation in the torque can be reduced.

Additionally, if the second clutch engagement capacity in the second clutch 5 is increased before the first clutch 3 is completely engaged, the load of the motor/generator 4 is increased, and there are cases in which the motor rotational speed drops. Consequently, there is the risk that a rapid engine start is inhibited. In contrast, in this first embodiment, the second clutch 5 maintains the second clutch engagement capacity in a zero state until the first clutch 3 is completely engaged, and continues to be disengaged. Then, the engagement of this second clutch 5 is started once the first clutch 3 is completely engaged. Accordingly, dropping of the motor rotational speed during engine start can be prevented, and a rapid engine start can be carried out. In addition, after the first clutch 3 is engaged, the engine toque can be utilized in addition to the motor torque. Accordingly, by engaging the second clutch 5, it is possible to make a drop in the rotational speed less likely to occur, even if the load of the motor/generator 4 is increased.

Furthermore, in this first embodiment, the second clutch 5 is engaged after the first clutch 3 is engaged; at this time, the rotational speed of the motor/generator 4 is maintained at a rotational speed that is higher than the second clutch output rotational speed (transmission input rotational speed) for a set time, after which the second clutch 5 is engaged. Here, there are cases in which the engine torque is unstable immediately after engine start; if the second clutch 5 is engaged in such a state, there is the risk that the motor rotational speed will drop. Accordingly, by increasing the motor rotational speed for a set time and putting the second clutch 5 in a slip engagement state, transmission of fluctuation in the engine torque can be prevented, and a generation of shock accompanying a drop in the rotational speed can be prevented.

In addition, the second clutch engagement capacity when engaging the second clutch 5 is gradually increased over time, at a change rate in accordance with the vehicle speed or the required driving force which is presented in the accelerator position opening amount. Accordingly, the vehicle acceleration that is generated by the second clutch 5 being gradually engaged can be presented as that which is in accordance with the required driving force and the vehicle speed. If the second clutch engagement capacity when disengaging the second clutch 5 is changed at a change rate in accordance with the vehicle speed or the required driving force which is presented in the accelerator position opening amount, the initial information acceleration, which is felt due to the release of the coast deceleration, which is generated by the second clutch 5 being disengaged, can be presented as that which is in accordance with the required driving force and the vehicle speed.

Next, the effects are described. The effects listed below can be obtained with the hybrid vehicle control device according to the first embodiment.

(1) A hybrid vehicle control device comprising, in the drive system, an engine (transverse engine) 2, a motor/generator 4, a first clutch 3 interposed between the engine 2 and the motor/generator 4, and a second clutch 5 interposed between the motor/generator 4 and a drive wheels (left and right front wheels) 10L, 10R; and an engine start control means (FIG. 2) that carries out engine start control using the motor/generator 4 as an engine start motor, when an engine start request is present, wherein the engine start control means (FIG. 2) is configured to comprise, when an engine start request based on an increase in the required driving force is generated during coasting/regenerating driving by the motor/generator 4 in an electric vehicle mode (EV mode) in which traveling is carried out with the first clutch 3 disengaged and the second clutch 5 engaged, a second clutch control section (Step S3) for completely disengaging the second clutch 5, and an engine start control section (Step S7) that causes the first clutch 3 to slip engage, and carries out an engine start control by carrying out an engine cranking operation, as well as injection and ignition of air and fuel. Accordingly, it is possible to cause the sensation of an initial information acceleration with respect to an increase in requested drive force while suppressing engine start shock during engine start during coasting/regenerating driving.

(2) The engine start control means is configured to comprise a motor rotational speed control section (Step S5) that reduces the rotational speed of the motor/generator 4, after completely disengaging the second clutch 5. Accordingly, in addition to the effect of (1) above, torque that is necessary for engine start can be secured, and engine start can be promptly carried out, even if the motor/generator 4 is a low-rated motor.

(3) When reducing the rotational speed of the motor/generator 4, the motor rotational speed control section (Step S5) is configured to gradually reduce the rotational speed over time. Accordingly, in addition to the effect of (2) above, even if the disengagement of the second clutch 5 is delayed, shock caused by fluctuation in the motor rotational speed or fluctuation in the torque can be reduced.

(4) The second clutch control section is configured to maintain the second clutch in a disengaged state until the first clutch 3 is completely engaged, and starts the engagement of the second clutch 5 when the first clutch 3 is completely engaged (Step S12, Step S13). Accordingly, in addition to the effect of any one of (1) to (3) above, it is possible to prevent a drop of the motor rotational speed during engine start.

(5) The motor rotational speed control section is configured to increase the rotational speed of the motor/generator 4 to be higher than the second clutch output rotational speed, and maintains the slip engagement of the second clutch 5 (Steps 13 thru 16) for a predetermined time after the first clutch 3 is completely engaged. Accordingly, in addition to the effect of any one of (1) to (4) above, it is possible to prevent a drop of the motor rotational speed due to an unstable engine torque immediately after engine start.

(6) The second clutch control section is configured to change the second clutch engagement capacity at a change rate in accordance with the vehicle speed or the required driving force, when engaging the second clutch 5. Accordingly, in addition to the effect of any one of (1) to (5) above, it is possible to present changes in the vehicle acceleration according to the required driving force or the vehicle speed.

The hybrid vehicle control device of the present invention was described above based on the first embodiment, but specific configurations thereof are not limited to this embodiment, and various modifications and additions to the design can be made without departing from the scope of the invention according to each claim in the Claims.

In the first embodiment, an example was shown in which, when the second clutch is disengaged, the second clutch torque command is set to zero at time t1 when an engine start request is generated. However, the invention is not limited thereto. The second clutch torque command, that is, the second clutch engagement capacity may be changed (reduced) at a change rate in accordance with the vehicle speed or the required driving force at this time. Accordingly, when disengaging the second clutch 5, it is possible to present changes in the vehicle acceleration according to the required driving force or the vehicle speed.

Additionally, at the time of accelerator depression acceleration during coasting/regenerating driving, a downshift request is commonly generated. In that case, the start of the downshift is put on hold until the engine rotational speed reaches a certain degree of rotational speed, for example, a value close to a target rotational speed after the completion of downshift. Here, if the transmission input rotational speed becomes high due to carrying out the downshift, when the motor rotational speed (engine rotational speed) tries to overtake the transmission input rotational speed after the engagement of the first clutch 3, an engine racing feeling results. Accordingly, the generation of an engine racing feeling can be prevented by carrying out downshift in a state in which the engine rotational speed is high, by putting the downshift on hold until the engine rotational speed reaches a certain rotational speed.

In addition, even in a case in which the accelerator is depressed again before the transverse engine 2 is completely stopped, it is possible to quickly carry out zero crossing while reducing shock, by immediately disengaging the second clutch 5 and combusting the transverse engine 2.

In the first embodiment, an example was shown in which, when carrying out engine cranking, the hydraulic pressure of the first clutch 3 is set to the cranking hydraulic pressure, and putting in a slip engagement state to start the engine, but the invention is not limited thereto. The engine may be started by setting the first clutch hydraulic pressure to the engagement hydraulic pressure at the time of engine cranking, and putting this first clutch 3 in an engaged state.

In the first embodiment, an example was shown in which the hybrid vehicle control device of the present invention is applied to an FF hybrid vehicle. However, the control device of the present invention is not limited to an FF hybrid vehicle, and may be applied to an FR hybrid vehicle, a 4WD hybrid vehicle, and a plug-in hybrid vehicle as well. In short, the invention may be applied to any hybrid vehicle.

In addition, an example was shown in which the automatic transmission is a belt type continuously variable transmission, but the invention is not limited thereto, and the automatic transmission may be a stepped automatic transmission. At this time, a clutch and brake provided inside the transmission may be used as the second clutch.

The invention claimed is:

1. A hybrid vehicle control device for controlling a drive system including an engine, a motor/generator, a first clutch interposed between the engine and the motor/generator, and a second clutch interposed between the motor/generator and a drive wheel, the hybrid vehicle control device comprising:
   a hybrid vehicle control module programmed to perform an engine start control using the motor/generator as an engine start motor, when an engine start request is present, the hybrid vehicle control device module is programmed to execute
   a second clutch control to completely disengage the second clutch; and
   an engine start control to cause the first clutch to engage or to slip engage, and to perform the engine start control by performing an engine cranking operation together with injection and ignition of air and fuel,
   the hybrid vehicle control module being further programmed to disengage the first clutch and engage the second clutch during coasting/regenerating driving with the motor/generator while traveling in an electric vehicle mode when the engine start request is due to a driver input for an increase in a required driving force.

2. The hybrid vehicle control device according to claim 1, wherein
   the hybrid vehicle control module is further programmed to execute a motor rotational speed control to reduce a rotational speed of the motor/generator, after completely disengaging the second clutch.

3. The hybrid vehicle control device according to claim 2, wherein
   the hybrid vehicle control module is further programmed to execute the motor rotational speed control to gradually reduce the rotational speed of the motor/generator over time when reducing the rotational speed of the motor/generator.

4. The hybrid vehicle control device according to claim 1, wherein
   the hybrid vehicle control module is further programmed to execute the second clutch control to maintain the second clutch in a disengaged state until the first clutch is completely engaged, and to start the engagement of the second clutch when the first clutch is completely engaged.

5. The hybrid vehicle control device according to claim 4, wherein
   the hybrid vehicle control module is further programmed to execute a motor rotational speed control to increase the rotational speed of the motor/generator to be higher than a prescribed clutch output rotational speed, and to maintain slip engagement of the second clutch for a predetermined time after the first clutch is completely engaged and engagement of the second clutch is started.

6. The hybrid vehicle control device according to claim 1, wherein
   the hybrid vehicle control module is further programmed to execute the second clutch control to change a second clutch engagement capacity at a change rate in accordance with at least one of a vehicle speed and the required driving force, when disengaging or engaging the second clutch.

7. The hybrid vehicle control device according to claim 2, wherein
   the hybrid vehicle control module is further programmed to execute the second clutch control to maintain the second clutch in a disengaged state until the first clutch is completely engaged, and to start the engagement of the second clutch when the first clutch is completely engaged.

8. The hybrid vehicle control device according to claim 7, wherein
   the hybrid vehicle control module is further programmed to execute the motor rotational speed control to increase the rotational speed of the motor/generator to be higher than a prescribed clutch output rotational speed, and to maintain slip engagement of the second clutch for a predetermined time after the first clutch is completely engaged and engagement of the second clutch is started.

9. The hybrid vehicle control device according to claim 2, wherein
   the hybrid vehicle control module is further programmed to execute the second clutch control to change a second clutch engagement capacity at a change rate in accordance with at least one of a vehicle speed and the required driving force, when disengaging or engaging the second clutch.

10. The hybrid vehicle control device according to claim 3, wherein
    the hybrid vehicle control module is further programmed to execute the second clutch control to maintain the second clutch in a disengaged state until the first clutch is completely engaged, and to start the engagement of the second clutch when the first clutch is completely engaged.

11. The hybrid vehicle control device according to claim 10, wherein
    the hybrid vehicle control module is further programmed to execute the motor rotational speed control to increase the rotational speed of the motor/generator to be higher than a prescribed clutch output rotational speed, and to maintain slip engagement of the second clutch for a predetermined time after the first clutch is completely engaged and engagement of the second clutch is started.

12. The hybrid vehicle control device according to claim 3, wherein
    the hybrid vehicle control module is further programmed to execute the second clutch control is programmed to change a second clutch engagement capacity at a change rate in accordance with at least one of a vehicle speed and the required driving force, when disengaging or engaging the second clutch.

13. The hybrid vehicle control device according to claim 4, wherein
    the hybrid vehicle control module is further programmed to execute the second clutch control to change a second clutch engagement capacity at a change rate in accordance with at least one of a vehicle speed and the required driving force, when disengaging or engaging the second clutch.

14. The hybrid vehicle control device according to claim 5, wherein
the hybrid vehicle control module is further programmed to execute the second clutch control to change a second clutch engagement capacity at a change rate in accordance with at least one of a vehicle speed and the required driving force, when disengaging or engaging the second clutch.

* * * * *